(12) United States Patent
Spada

(10) Patent No.: US 6,785,999 B1
(45) Date of Patent: Sep. 7, 2004

(54) FISH CONTAINMENT DEVICE

(76) Inventor: Robert Spada, 15131 Triton Ln #105, Huntington Beach, CA (US) 92649

(*) Notice: Subject to any disclaimer, the term of this patent is extended or adjusted under 35 U.S.C. 154(b) by 0 days.

(21) Appl. No.: 10/206,297

(22) Filed: Jul. 26, 2002

(51) Int. Cl.⁷ .............................................. A01K 97/04
(52) U.S. Cl. .......................................... 43/55; 43/54.1
(58) Field of Search ................ 43/54.1, 55; 206/315.11

(56) References Cited

U.S. PATENT DOCUMENTS

| | | | | |
|---|---|---|---|---|
| 3,357,127 A | * | 12/1967 | Barradale ....................... | 43/55 |
| 4,128,170 A | * | 12/1978 | Elliott .................... | 206/315.11 |
| 4,353,182 A | * | 10/1982 | Junkas et al. ................. | 43/54.1 |
| 4,794,723 A | * | 1/1989 | Arnold et al. ................. | 43/55 |
| 5,305,544 A | * | 4/1994 | Testa, Jr. ..................... | 43/54.1 |
| 5,319,877 A | * | 6/1994 | Hagan ......................... | 43/54.1 |
| 6,014,833 A | * | 1/2000 | Benavidez .................. | 43/54.1 |
| 6,193,062 B1 | * | 2/2001 | Rysgaard et al. ...... | 206/315.11 |
| 6,269,587 B1 | * | 8/2001 | Wallace ....................... | 43/54.1 |
| 6,374,532 B1 | * | 4/2002 | Klein ............................. | 43/17 |
| 6,446,382 B1 | * | 9/2002 | Cloutier et al. .............. | 43/54.1 |
| 6,460,287 B1 | * | 10/2002 | Louie .......................... | 43/54.1 |

* cited by examiner

*Primary Examiner*—Kurt Rowan

(57) ABSTRACT

A fish containment device for storing fish, bait and tools while fishing. The fish containment device includes a body member comprising a perimeter wall. The perimeter wall defines an interior space of the body member. The interior space of the body member comprises an open top end for permitting fish and water to placed in the interior space of the body member. A plate member is positionable over the open top end of the interior space of the body member for selectively closing the open top end of the interior of the body member. The plate member is designed for being sat on by a user when the plate member is positioned on the body member. A bait member is coupled to the plate member for holding bait to be used by the user when the user is fishing.

1 Claim, 2 Drawing Sheets

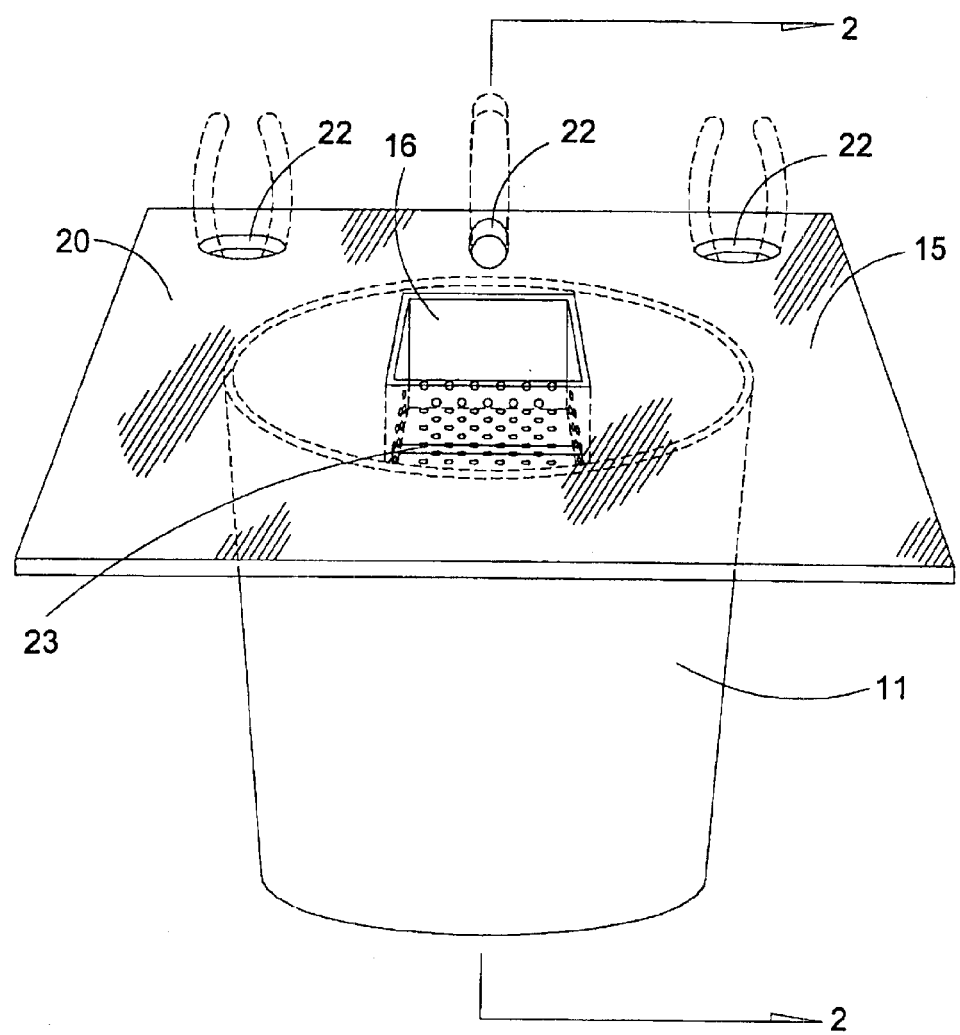

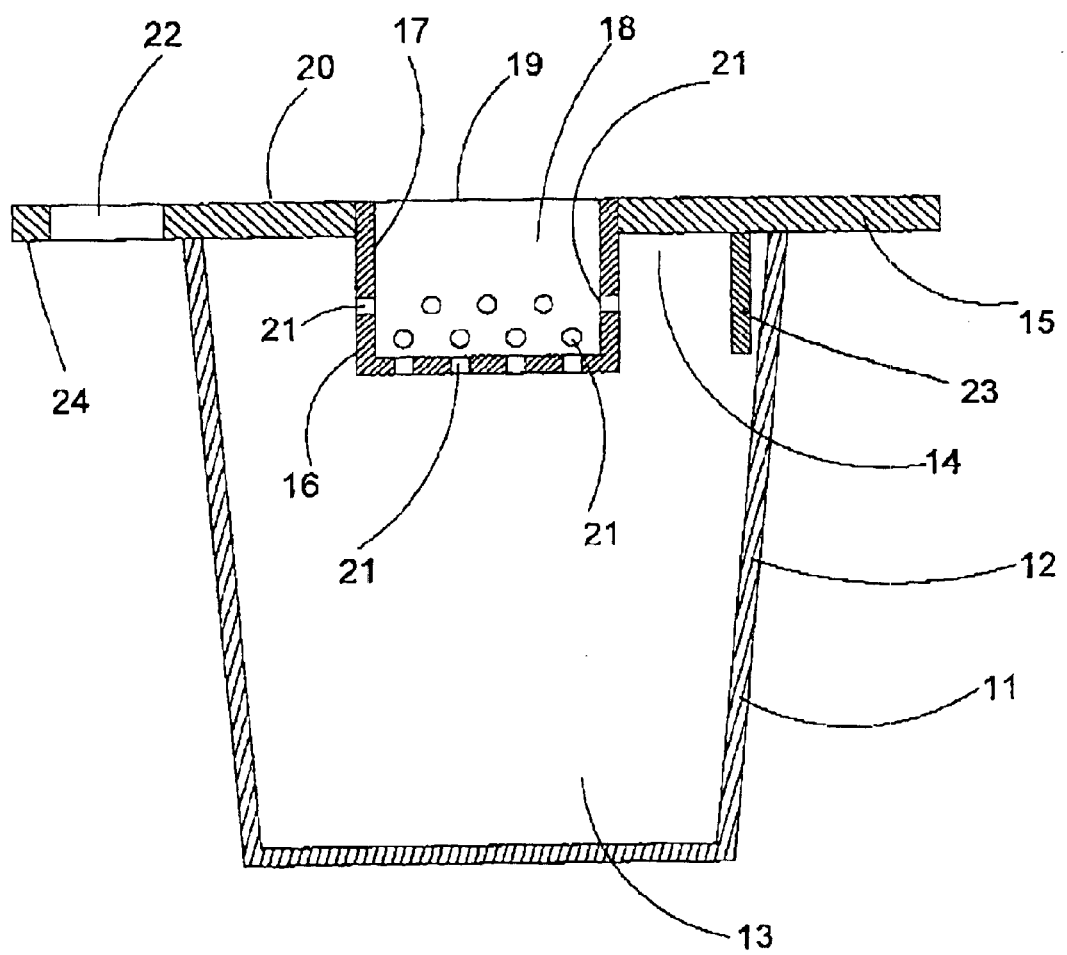

FISH CONTAINMENT DEVICE

BACKGROUND OF THE INVENTION

1. Field of the Invention

The present invention relates to bait boxes and more particularly pertains to a new fish containment device for storing fish, bait and tools while fishing.

2. Description of the Prior Art

The use of bait boxes is known in the prior art. U.S. Pat. No. 2,800,741 describes a device for storing live fishing bait. Another type of bait box is U.S. Pat. No. 5,303,500 having a bucket having a plurality of stackable trays positionable within for holding tackle. U.S. Pat. No. 6,237,765 has a bucket with an inner chamber for holding bait and an outer chamber to hold ice or the like to keep the bait cold.

While these devices fulfill their respective, particular objectives and requirements, the need remains for a device that has certain improved features that allow the user to obtain bait without having to open the container.

SUMMARY OF THE INVENTION

The present invention meets the needs presented above by providing a bait member with an open upper end being aligned with the top surface of the plate member to allow the user access to the bait without have stand up from a seated position on the plate member.

Still yet another object of the present invention is to provide a new fish containment device that has tool apertures for folding tool to remove hooks and clean fish.

Even still another object of the present invention is to provide a new fish containment device that a transparent plate member to allow the user to readily view into the interior space of the body member without having to lift the plate member.

To this end, the present invention generally comprises a body member comprising a perimeter wall. The perimeter wall defines an interior space of the body member. The interior space of the body member comprises an open top end whereby the open top end is designed for permitting fish and water to placed in and removed from the interior space of the body member. A plate member is selectively positionable on the body member. The plate member is positionable over the open top end of the interior space of the body member for selectively closing the open top end of the interior of the body member when the plate member is positioned on the body member. The plate member is designed for being sat on by a user when the plate member is positioned on the body member. A bait member is coupled to the plate member whereby the bait member extends through the open top end and into the interior space of the body member when the plate member is positioned on the body member. The bait member is designed for holding bait to be used by the user when the user is fishing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new fish containment device according to the present invention.

FIG. 2 is a cross-sectional view of the present invention taken along line 2—2 of FIG. 1.

DESCRIPTION OF THE PREFERRED EMBODIMENT

With reference now to the drawings, and in particular to FIGS. 1 through 2 thereof, a new fish containment device embodying the principles and concepts of the present invention and generally designated by the reference numeral 10 will be described.

As best illustrated in FIGS. 1 through 2, the fish containment device 10 generally comprises a body member 11 comprising a perimeter wall 12. The perimeter wall 12 defines an interior space 13 of the body member 11. The interior space 13 of the body member 11 comprises an open top end 14 whereby the open top end 14 is designed for permitting fish and water to placed in and removed from the interior space 13 of the body member 11.

A plate member 15 is selectively positionable on the body member 11. The plate member 15 is positionable over the open top end 14 of the interior space 13 of the body member 11 for selectively closing the open top end 14 of the interior of the body member 11 when the plate member 15 is positioned on the body member 11. The plate member 15 is designed for being sat on by a user when the plate member 15 is positioned on the body member 11.

A bait member 16 is coupled to the plate member 15 whereby the bait member 16 extends through the open top end 14 and into the interior space 13 of the body member 11 when the plate member 15 is positioned on the body member 11. The bait member 16 is designed for holding bait to be used by the user when the user is fishing.

The bait member 16 comprises a peripheral wall 17. The peripheral wall 17 defines a storage space 18 of the bait member 16. The storage space 18 comprises an open upper end 19 whereby the open upper end 19 of the storage space 18 is designed for permitting insertion of bait into the storage space 18 of the bait member 16.

The bait member 16 extends through the plate member 15 whereby the open upper end 19 of the storage space 18 of the bait member 16 is aligned with a top surface 20 of the plate member 15. The open upper end 19 of the storage space 18 is designed for providing access to the storage space 18 of the bait member 16 by the user when the user is seated on the plate member 15.

The bait member 16 comprises a plurality of fluid apertures 21. Each of the fluid apertures 21 extends through the peripheral wall 17 of the bait member 16. The fluid apertures 21 are designed for permitting water in the interior space 13 of the body member 11 through the storage space 18 of the bait member 16 when the plate member 15 is positioned on the body member 11.

A plurality of a tool apertures 22 extend through the plate member 15. Each of the tool apertures 22 is designed for receiving one of a plurality of tools for aiding in removing a hook from the fish and cleaning of the fish. A pair of the tool apertures 22 are substantially elliptical shaped whereby each of the tool apertures 22 is designed for receiving one of a pair of pliers, such as a pair of needle nose pliers and a pair of side cutting pliers. One of the tool apertures 22 is substantially elongated whereby the associated one of the tool apertures 22 is designed for receiving a knife.

A retaining wall 23 is coupled to the plate member 15. The retaining wall 23 downwardly extends from a bottom surface 24 of the plate member 15 whereby the retaining wall 23 extends into the interior space 13 of the body member 1 1. The retaining wall 23 engages an interior surface of the perimeter wall 12 of the body member 11 for inhibiting sliding of the plate member 15 with respect to the body member 11 when the plate member 15 is positioned on the body member 11.

The plate member 15 comprises a transparent material. The transparent material is designed for permitting the user to view into the interior space 13 of the body member 11 when the plate member 15 is positioned on the body member 11.

In use, the user pours water into the interior space 13 of the body member 11. The user then places the plate member 15 on the body member 11 and ensures that the retaining wall 23 engages the interior surface of the perimeter wall 12 of the body member 11. The user can then sit upon the plate member 15 and retrieve bait from the storage space 18 of the bait member 16 to bait a hook. After catching a fish the user can the user the needle nose pliers stored in one of the tool apertures 22 to remove the hook and the side cutting pliers to cut the hook if necessary. The user then lifts the plate member 15 and inserts the fish into the interior space 13 of the body member 11. After the user has finished fishing the knife can be withdrawn from the tool apertures 22 and used to fillet the fish on the plate member 15.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish containment device for holding bait and fish, the fish containment device comprising:

a body member comprising a perimeter wall, said perimeter wall defining an interior space of said body member, said interior space of said body member comprising an open top end such that said open top end is adapted for permitting fish and water to placed in and removed from said interior space of said body member;

a plate member being selectively positionable on said body member, said plate member being positionable over said open top to and of said interior space of said body member for selectively closing said open top end of said interior of said body member when said plate member is positioned on said body member, said plate member being adapted for being sat on by a user when said plate member is positioned an said body member;

a bait member being coupled to said plate member such that said bait member extends through said open top end and into said interior spice of said body member when said plate member is positioned on said body member, said bait member being adapted for holding bait to be used by the user when the user is fishing;

said bait member comprising a peripheral wall, said peripheral wall defining a storage space of said bait member, said storage space comprising an open upper end such that said open upper end of said storage space is adapted for permitting insertion of bait into said storage space of said bait member;

said bait member extending through said plate member such that said open upper end of said storage space of said bait member is aligned with a top surface of said plate member, said open upper end of said storage space being adapted for providing access to said storage space of said bait member by the user when the user is seated on said plate member;

said bait member comprising a plurality of fluid apertures, each of said fluid apertures extending through said peripheral wall of said bait member, said fluid apertures being adapted for permitting water in said interior space of said body member through said storage space of said bait member when said plate member is positioned on said body member;

a plurality of a tool apertures extending through said plate member, each of said tool apertures being adapted for receiving one of a plurality of tools for aiding in removing a hook from the fish and cleaning of the fish;

a pair of said tool apertures being substantially elliptical shaped such that each of said tool apertures is adapted for receiving one of a pair of pliers;

one of said tool apertures being substantially elongated such that the associated one of said tool apertures is adapted for receiving a knife;

a retaining wall being coupled to said plate member, said retaining wall downwardly extends from a bottom surface of said plate member such that said retaining wall extends into said interior space of said body member, said retaining wall engages an interior surface of said perimeter wall of said body member for inhibiting sliding of said plate member with respect to said body member when said plate member is positioned on said body member; and said plate member comprising a transparent material, said transparent material being adapted for permitting the user to view into said interior space of said body member when said plate member is positioned on said body member.

* * * * *